United States Patent Office 3,361,703
Patented Jan. 2, 1968

3,361,703
POLYMER STABILIZATION WITH HETEROCYCLIC NITROGEN-CONTAINING THIOLS
Clifford W. Childers, Bartlesville, Okla., assignor to Phillips Petroleum Company, a corporation of Delaware
No Drawing. Filed Mar. 30, 1964, Ser. No. 355,910
13 Claims. (Cl. 260—33.6)

ABSTRACT OF THE DISCLOSURE

Stabilization of polymers containing carbon black by incorporating therein a stabilizing amount of certain heterocyclic nitrogen-containing thiols.

---

This invention relates to the stabilization of polymeric materials. In accordance with another aspect, this invention relates to polymeric compositions containing carbon black subject to oxidative degradation stabilized against such degradation. In accordance with another aspect, this invention relates to a method for inhibiting oxidation of polymeric materials. In accordance with a further aspect, this invention relates to novel oxidative degradation stabilizer combinations for inhibiting oxidation of polymeric materials subject to oxidative degradation. In accordance with a further aspect, this invention relates to the stabilization of polymeric materials containing carbon black and extender oils.

Natural and synthetic rubbers, as well as polyolefins, are subject to oxidative degradation when exposed to an oxygen-containing atmosphere, particularly at elevated temperatures and/or in the presence of actinic light. This oxidative degradation is accelerated by the presence of reinforcing agents, such as carbon black, in polymeric masterbatches. Such degradation results in loss of processability, embrittlement, loss of tensile strength and elongation, detrimental color changes, decrease in inherent viscosity, increase in percentage gel, decrease in swelling index, and the like. Thus, it can be seen that there is a general deterioration in the physical properties of such polymers. Numerous additives have been proposed for inhibiting such oxidative degradation, most of which, while possibly effective in one aspect or another, have many shortcomings. Because of the presence of reinforcing agents, such as carbon black in many polymer compositions, these shortcomings are especially apparent in attempts to prevent or slow down oxidative degradation of polymeric-carbon black masterbatches.

The present invention relates to novel antioxidants and novel antioxidant combinations which are highly effective in stabilizing such polymers against oxidative degradation.

Accordingly, an object of this invention is to provide polymeric materials stabilized against oxidation.

Another object of this invention is to provide a method for stabilizing polymers such as natural and synthetic rubbers and polyolefins against oxidative degradation.

Another object of this invention is to provide new compositions of matter and to advance the art.

Still another object of this invention is to provide novel antioxidants for stabilizing polymers containing carbon black subject to oxidative degradation.

Other objects, aspects, as well as the several advantages of the invention, will become apparent to those skilled in the art upon a study of this disclosure and the appended claims.

In accordance with the present invention, it has now been found that polymers subject to oxidative degradation can be stabilized against such degradation by incorporation therein of a stabilizing amount of certain heterocyclic nitrogen-containing thiols.

More specifically, in accordance with the present invention, it has now been found that polymers such as natural rubber and solid and rubbery synthetic polymers formed by polymerizing monomers containing a vinylidene group ($H_2C=C<$) can be stabilized against oxidative degradation by incorporating therein heterocyclic nitrogen-containing thiols having the structural formula

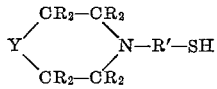

wherein Y is selected from O, $CR_2$ and NH, R is selected from hydrogen and hydrocarbon radicals selected from alkyl, cycloalkyl and aryl radicals having from 1 to 10, inclusive, carbon atoms, and R' is a saturated hydrocarbon radical selected from bivalent saturated acyclic and cyclic hydrocarbon radicals having from 1 to 8, inclusive, carbon atoms.

Representative examples of suitable heterocyclic nitrogen-containing thiol compounds that can be used as antioxidants according to the invention include:

1,1-dimethyl-2-N-piperidylethanethiol
2-ethyl-3-N-morpholinylpropanethiol
1,4-dimethyl-3-N-piperazinylcyclohexanethiol
N-morpholinylmethanethiol
2-methyl-3-N-morpholinylpropanethiol
4-N-morpholinylcyclohexanethiol
2-N-morpholinylcyclopentanethiol
2,4-dimethyl-3-N-morpholinylcyclohexanethiol
1-cyclopentyl-2-N-morpholinylethanethiol
1,1-dimethyl-2-N-morpholinylethanethiol
2,2-diethyl-4-N-piperidylbutanethiol
2,3,4-trimethyl-5-N-piperidylcyclopentanethiol
1-cyclopentyl-1-methyl-2-N-piperidylethanethiol
1-cyclohexyl-2-N-piperidylethanethiol
1,1-dimethyl-2-N-piperazinylethanethiol
3-N-piperazinylcyclopentanethiol
3,3-dimethyl-5-N-piperazinylpentanethiol
8-N-piperazinyloctanethiol
cyclohexyl-N-piperazinylmethanethiol
1,1-dimethyl-2-N-(2,5-diethylpiperidyl)ethanethiol
2-ethyl-3-N-(2,3,5,6-tetramethylmorpholinyl) propanethiol
1,4-dimethyl-3-N-(3-cyclohexyl-6-phenylpiperazinyl) cyclohexanethiol
N-(2,5-didecylmorpholinyl)methanethiol
1-cyclopentyl-2-N-(2,5-di(3,4-diethylcyclohexyl) piperidyl)ethanethiol
1,1-dimethyl-2-N-((3,5-diethylphenyl)morpholinyl) ethanethiol
2,3,4-trimethyl-5-N-((2-methyl-3,4-di-n-propylcyclopentyl)piperidyl)-cyclopentanethiol
1,4-dimethyl-3-N-(3-cyclohexyl-6-phenylpiperazinyl)
3,3-dimethyl-5-N-(3,5-di-1-naphthylpiperazinyl) pentanethiol
2-methyl-3-N-(2-methylpiperazinyl)propanethiol and the like.

The stabilizers or antioxidants of the invention can be incorporated in the polymer to be stabilized in any desired amount depending upon the conditions under which the polymer is to be used. However, the total amount of stabilizer required to produce the desired stabilizing effect has been found to be relatively small and will generally range from 0.1 to 5 parts by weight, preferably from 0.3 to 3 parts my weight, per 100 parts polymer.

The heterocyclic nitrogen-containing thiol compounds employed as stabilizers of this invention can be prepared by any method known in the art. Also, the stabilizers can be incorporated into the polymer to be stabilized by any suitable means such as hot milling in a roll mill or hot mixing in a Banbury mixed, solution blending, and the like.

The materials that can be stabilized according to the invention include in general polymeric materials that are subject to oxidative degradation. More specifically, the polymeric materials that can be effectively stabilized according to the invention include natural rubber and synthetic polymers formed from conjugated dienes and monoolefins containing carbon black.

The preferred class of polymers stabilized according to the invention include both homopolymers and copolymers of conjugated dienes having from 4 to 12 carbon atoms, preferably conjugated dienes having from 4 to 8 carbon atoms per molecule such as 1,3-butadiene, isoprene, piperylene, methylpentadiene, 2 - methyl - 1,3-hexadiene, phenylbutadiene, 3,4 - dimethyl-1,3-hexadiene, 4,5 - diethyl - 1,3-octadiene, and the like. Among these butadiene, isoprene, and piperylene are preferred. In addition, suitable polymeric materials that can be stabilized include copolymers of the above-mentioned conjugated dienes with compounds containing a vinylidene group ($H_2C=C<$) such as isobutylene, styrene, p-methoxystyrene, vinylnaphthalene, vinyltoluene, heterocyclic nitrogen-containing monomers such as pyridine and quinoline derivatives containing at least one vinyl or alpha-methyl-vinyl group such as 2-vinylpyridine and 2-methyl-5-vinyl-pyridene, acrylic and alkacrylic acid esters, such as methyl acrylate, ethyl acrylate, and methylmethacrylate, methyl vinyl ether, vinyl chloride, vinylidene chloride, and the like.

The antioxidants of the invention can also be used to stabilize polymers of monoolefins having from 2 to 8 carbon atoms such as polyethylene, polypropylene, polybutene, copolymers of ethylene with propylene, 1-butene, and the like. These synthetic polymers of monomers containing a vinylidene group ($H_2C=C<$) can be made by a number of well known processes. Emulsion polymerization of butadiene and vinylidene-containing monomers such as styrene and the vinylpyridines, for example, is a well established process. Mass or solution polymerization employing various catalyst systems are likewise known methods of preparing polymers of mono and diolefins, for example, polyethylene, polypropylene, polybutadiene, polyisoprene, ethylene-propylene rubber, ethylene-propylene terpolymer rubber, and the like.

As indicated previously, the present invention is preferably applicable to the stabilization of polymeric compositions subject to oxidative degradation containing pigments or reinforcing agents such as carbon black. The invention is particularly useful in stabilizing polymer-carbon black masterbatches, including oil-extended masterbatches. The carbon black employed can be any of the types including both channel and furnace black, lamp black, and the like. Where reference is made to carbon black or carbon particles, this term should be understood to include all forms of carbon which have been found effective for reinforcing or light shielding in polymeric materials. The particle size of the carbon black preferably does not exceed about 1000 Angstroms. Although the invention is discussed in terms of carbon black, the teachings of the invention obviously can be practiced with advantage to the incorporation of other prime reinforcing and extender pigments. Other pigments which are obtained as insoluble particulate solids, such as zinc oxide, titanium dioxide, clays, hydrated alumina, precipitated calcium carbonates, and the like, can be used instead of carbon black or together with carbon black when desired.

The amount of pigment or carbon black employed in reinforcing polymeric materials will vary appreciably depending upon the particular polymeric material being extended. For example, polymers of conjugated dienes can contain up to about 250 weight parts of carbon black per 100 weight parts of polymer and often will contain from 10 to about 150 weight parts per 100 parts of polymer. Polymers of monoolefins often contain small amounts of carbon black for light shielding purposes and the amount of carbon black employed generally will be in the range of from about 0.5 to about 10 weight parts per 100 weight parts of polymer although amounts outside this range can be employed when desired. It is often preferred to employ from about 1 to about 5 weight parts of carbon black per 100 parts of polymers of monoolefins. Thus, the amount of carbon black employed in polymers applicable according to the invention can range from 0.5 to 250 weight parts per 100 parts of polymer, preferably from 1 to 150 weight parts.

"Rubber reinforcing black," or "rubber reinforcing carbon black" are generic terms and are given to any of a large variety of carbon blacks that are used in the formulation of polymer compositions, which carbon blacks are applicable to masterbatches of the invention. These blacks are available through normal commercial channels in a large variety of trade names and/or type names as "easy processing channel black," "medium processing channel black," "hard processing channel black," "high abrasion furnace black," "super abrasion furnace black," "intermediate super abrasion furnace black," "high modulus furnace black," "semi-reinforcing black," and others which are all characterized by their known utility in the compounding of rubber formulations. These blacks differ by the method of preparing them and/or their average particle sizes and their use in rubber formulations is a matter of choice depending upon the particular rubber that one desires to produce. The present invention is particularly directed to the stabilization of polymeric-carbon black masterbatches containing any of the above described carbon blacks.

The above-described polymeric-carbon black masterbatches can also be oil extended with any of the known rubber extender oils. The oils that can be employed in the present invention are referred to in the art as "compatible oils" or "compatible rubber extending oils." Among the compatible oils are those ordinarily derived from petroleum although they may be derived from coal tar or other suitable sources. Generally, they have a viscosity of about 10 cs. at 210° F. up to more or less solid materials softening at about 100 to 200° F., have a boiling point of at least 300° F. at 10 mm./Hg and have a specific gravity (60/60 F.) of about 0.9 to 1.05. These are primary higher hydrocarbons and can be vacuum distillates of petroleum as well as extracts and/or raffinates of such distillates. Also suitable are residues of petroleum distillation operations. Especially suited are extending oils of the type known as highly aromatic oils. The amount of extender oil employed will vary appreciably depending upon the particular polymeric material being extended, but in general the amount of oil will range up to about 100 weight percent of the carbon black present, preferably from about 10 to about 50 weight percent of the carbon black present.

As indicated above, the heterocylic nitrogen-containing thiol antioxidant compounds of the invention can be used in combination with other antioxidants to increase the stability of the polymer against oxidative degradation. A preferred auxiliary antioxidant that can be used within the essence of the invention are the phenolic antioxidants. The phenolic antioxidants that can be employed in the invention are compounds well known in the art and include alkylated phenols and bis-phenols. The alkylated phenols are compounds of the general formula:

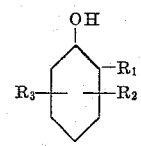

wherein $R_1$, $R_2$ and $R_3$ are alkyl groups which may be the same or different, each of which contains from 1 to 12 carbon atoms. Examples of such compounds are 2,4,6-trimethylphenol, 2,4,6-triisopropylphenol, 2,4,6-tri-tert-butylphenol, 2,4,6-tridodecylphenol, 2,6-di-tert-butyl-4-methylphenol, 2-tert-butyl-4,6-dimethyl phenol, 2,6-methyl-4-dodecylphenol, 2,4,5-trimethylphenol, 2-tert-butyl-3,4-dimethylphenol, and 2,6-di-tert-butyl-3-methylphenol, and the like.

The bis-phenols are compounds of the general formula:

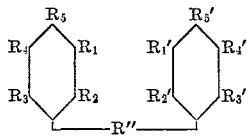

in which R" is sulfur or an alkylidene group, and at least one and not more than two of the R and R' groups are hydroxyl, the remainder being hydrogen, alkyl, or cycloalkyl groups, at least one of such groups on each aromatic ring containing from 4 to 10 carbon atoms. Typical of such compounds are 4,4'-thio-bis(6-tert-butyl-m-cresol), 4,4' - thio-bis(6-dodecyl-m-cresol),4,4'-butylidene - bis(6-tert-butyl-m-cresol),2,2' - methylene-bis(4-methyl-6-tert-butylphenol), and the like. Of the foregoing compounds presently preferred are 2,6-di-tert-butyl-4-dene - bis(6-tert-butyl-m-cresol), 2,2' - methylene-bis(4-butylidene - bis(6 - tert-butyl-3-methylphenol), and 2,2'-methylene-bis(4-methyl-6-tert-butylphenol).

The amount of phenolic-antioxidant stabilizer employed in combination with the heterocyclic nitrogen-containing thiols of the invention will generally be in the range of 0.01 to 5 weight parts per 100 parts of polymer, preferably 0.1 to 3 weight parts per 100 parts of polymer. The phenolic antioxidant can be incorporated into the polymer along with the heterocyclic nitrogen-containing thiol or the antioxidants can be incorporated separately, as desired.

Other materials can be incorporated into the polymers stabilized according to the invention prior to, together with, or subsequent to the addition of the above-described antioxidants. These include pigments, dyes, other stabilizers, antistatic agents, fillers, softeners, stress cracking inhibitors, vulcanizing agents, vulcanization accelerators, etc.

The following example will illustrate the present invention in greater detail, but is not to be construed as limiting the invention.

The high cis-polybutadiene used in the masterbatches that were used in the tests reported in Example I was prepared by polymerizing butadiene in a reactor system consisting of two parallel trains having three 4,000 gallon stirred reactors in each train followed by a common reactor, using the following recipe:

| | |
|---|---|
| Butadiene _____ lb./min__ | 152.3 |
| Toluene _____ lb./min__ | 1350.0 |
| Triisobutylaluminum _____ p.h.m__ | 0.63 |
| Iodine _____ p.h.m__ | 0.186 |
| Titanium tetrachloro _____ p.h.m__ | 0.0563 |

P.h.m.=part per 100 parts of monomer.

Reaction was initiated at 45° F. and the temperature was allowed to rise to about 75° F. Residence time in each of the reactors in the parallel trains was 37.4 minutes and in the common reactor was 18.7 minutes. After addition of 0.43 phr. (part per 100 parts of rubber) of Cyanox SS[2,2' - methylene - bis-(4-methyl-6-tert-butylphenol)], a commercial antioxidant, and 2.0 phr. of Resin 731D (a disproportionated pale rosin stable to heat and light) shortstop, the effluent from the final common reactor was steam stripped for recovery of the rubber crumb, and the crumb was water-washed and dried. Conversion was 80 percent to a polybutadiene having the following properties:

| Microstructure, percent [3] | |
|---|---|
| Cis _____ | 93.3 |
| Trans _____ | 3.2 |
| Vinyl _____ | 3.5 |
| Inherent viscosity [1] _____ | 2.53 |
| Gel, percent [2] _____ | 0 |

[1] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

[3] Polymer samples were dissolved in carbon disulfide to form a solution having 25 grams of polymer per liter of solution. The infrared spectrum of each of the solutions (percent transmission) was then determined in a conventional infrared spectrometer.

The percent of the total unsaturation present as trans 1,4-was calculated according to the following equation and consistent units:

$$\epsilon = \frac{E}{tc}$$

where $\epsilon$=extinction coefficient (liters-mols$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The precent of the total unsaturation present as cis 1,4-was obtained by subtracting the trans 1,4- and 1,2- (vinyl) determined according to the above procedure from the theoretical unsaturation, assuming one double bond per each $C_4$ unit in the polymer.

Polybutadiene/black/oil masterbatches were prepared by milling together the following ingredients:

| | Parts by weight |
|---|---|
| High cis-polybutadiene _____ | 100 |
| Philblack I [4] _____ | 60 |
| Philrich 5 [5] _____ | 20 |

[4] An intermediate super-abrasion furnace black.
[5] A highly aromatic extender oil.

These masterbatches were used in the tests reported in Example I.

*Example I*

Seven masterbatch samples were prepared and tested for oxygen absorption for compounds of the invention and for commercial antioxidants. In each sample, the masterbatch was milled into a strip about 0.03 inch thick, a one-gram portion of this strip was supported on glass wool and was in turn supported on aluminum foil in an oxygen absorption tube, and the time required for the absorption of 10 cc. of oxygen was determined at a temperature of 100° C. The masterbatches represented by Samples 1–5 were made using high cis-polybutadiene containing commercial antioxidants. The masterbatches represented by Samples 6 and 7 were made using high cis-polybutadiene containing both an antioxidant of the invention and a small amount of a commercial antioxidant. The results of these tests are set forth in the following table:

TABLE

| Sample No. | Material Used | Concentration | | Time to absorb 10 cc. $O_2$, hr. |
|---|---|---|---|---|
| | | Phr. | Mhr. | |
| 1 | Cyanox SS [1] | 0.43 | 1.3 | 33 |
| 2 | Santonox R [2] | 1.95 | 5.4 | 20 |
| 3 | PBNA [3] | 0.77 | 5.4 | 75 |
| 4 | Ionol | 1.25 | 5.4 | 45 |
| 5 | Santoflex AW [4] | 1.25 | 5.4 | 75 |
| 6 | DMNPET [5][6] | 0.94 | 5.4 | 120 |
| 7 | DMNPET [5][6] | 1.88 | 10.8 | 160 |
| 8 | None | | | 24 |
| 9 | DMNPET [6] | 0.94 | 5.4 | 96 |
| 10 | DMNPET [6] | 1.88 | 10.8 | 128 |

[1] 2,2'-methylene-bis-(4-methyl-6-tert-butyl phenol).
[2] 4,4'-thiobis(6-tert-butyl-m-cresol).
[3] Phenyl-beta-naphthyl amine.
[4] 6-ethoxy-1,2-dihydro-2,2,4-trimethylquinoline.
[5] 1,1-dimethyl-2-N-piperidylethanethiol.
[6] Plus 0.43 phr of Cyanox SS.
[6] For these tests practically all the Cyanox SS originally present in the polybutadiene was removed by dissolving the rubber in toluene, precipitating with methanol, and vacuum drying at room temperature.

It can be seen that oxygen absorption is relatively rapid for the commercial antioxidants utilized in Samples 1–5. However, it will be observed from Samples 6, 7, 9 and 10 that a compound of the invention substantially reduced the rate of oxygen absorption.

*Example II*

High cis-polybutadiene masterbatches were prepared according to the following recipes:

| Blend | Parts by Weight | | |
|---|---|---|---|
| | 1 | 2 | 3 |
| High-cis polybutadiene | 100 | 100 | 100 |
| Philblack I [1] | 70 | 70 | 70 |
| Philrich 5 [2] | 30 | 30 | 30 |
| Zinc Oxide | 3 | 3 | 3 |
| Stearic Acid | 2 | 2 | 2 |
| Flexamine [3] | 1 | 1 | 1 |
| Sulfur | 1.85 | 1.85 | 1.85 |
| Santocure [4] | 1.45 | 1.45 | 1.45 |
| Ionol [5] | 0.75 | | |
| DMNPET [6] | | 0.75 | |
| Cyanox SS [7] | 0.43 | 0.43 | 0.43 |
| Resin 731 [8] | 3 | | |

[1] An intermediate super-abrasion furnace black.
[2] A highly aromatic extender oil.
[3] A physical mixture of a complex diarylamine-ketone reaction product (65%) and N,N'-diphenyl-p-phenylenediamine (35%).
[4] N-cyclohexyl-2-benzothiazole sulfonamide.
[5] 2,6-di-tert-butyl-4-methylphenol.
[6] 1,1'-dimethyl-2-N-piperidylethanethiol.
[7] 2,2'-methylene-bis(4-methyl-6-tert-butylphenol).
[8] A disproportionated pale rosin stable to heat and light.

After air-aging portions of these masterbatches at 160° F. for the indicated time they were cured (30 minutes, 307° F.), and tensile strength and heat build-up were determined:

| Aging time before curing | Tensile Strength, p.s.i., 80° F.[1] | | |
|---|---|---|---|
| None | 2,520 | 2,380 | 2,430 |
| 2 weeks | 2,240 | 2,500 | 2,090 |
| 4 weeks | 2,210 | 2,270 | 1,400 |
| 6 weeks | 1,820 | 2,200 | 1,080 |

| | Heat Build Up T., F.[2] | | |
|---|---|---|---|
| None | 61 | 66 | 62 |
| 2 weeks | 64 | 58 | 71 |
| 4 weeks | 72 | 60 | 82 |
| 6 weeks | 76 | 62 | 81 |

[1] ASTM D 412–61T. Scott Tensile Machine L-6.
[2] ASTM D 623-58. Method A, Goodrich Flexometer, 143 lb./sq. in. load, 0.175-inch stroke. Test specimen is a right circular cylinder 0.7 inch in diameter and 1 inch high.

These data show the marked effect on tensile and heat build-up resulting from incorporating an antioxidant of the invention in a masterbatch containing Cyanox SS compared with the original masterbatch, and compared with the original masterbatch to which a different antioxidant (Ionol) was added.

Additional data were determined for oxygen absorption (Method of Example I) for masterbatches made with an SBR rubber and with natural rubber.

*Example III*

Oxygen absorption studies were made in the same manner as in Example I with masterbatches prepared by milling together the following ingredients:

| Sample No. | Parts by Weight | | | | | |
|---|---|---|---|---|---|---|
| | 1 | 2 | 3 | 4 | 5 | 6 |
| Philprene 1500 [1] | 100 | 100 | 100 | | | |
| No. 1 Smoked Sheet [2] | | | | 100 | 100 | 100 |
| Philblack I [3] | 60 | 60 | 60 | 60 | 60 | 60 |
| Philrich 5 [4] | 20 | 20 | 20 | 20 | 20 | 20 |
| DMNPET [5] | | 0.94 | 1.88 | | 0.94 | 1.88 |
| Time at 100° C. to absorb 10 cc. $O_2$, hr | 88 | 150 | 170 | 25 | 45 | 80 |

[1] An SBR rubber prepared according to the recipe in ASTM D 1419–61T. As prepared, this rubber contains 1.25 phr. of BLE antioxidant (a high-temperature reaction product of diphenylamine and acetone). For these tests most of this antioxidant was removed by dissolving the rubber in toluene, precipitating with methanol, and vacuum drying at room temperature. As indicated by the results for Sample No. 1, some residual BLE remained; the same amount is present in Samples 1, 2, and 3.
[2] Natural rubber containing no added antioxidant.
[3] An intermediate super-abrasion furnace black.
[4] A highly aromatic extender oil.
[5] 1,1'-dimethyl-2-N-piperidylethanethiol.

These data show the stabilizing effect of an antioxidant of the invention in masterbatches prepared with two additional types of rubber, namely SBR rubber and natural rubber.

As will be evident to those skilled in the art, various modifications of this invention can be made or followed in the light of the foregoing disclosure and discussion without departing from the spirit or scope thereof.

I claim:
1. A polymer-carbon black composition of increased stability against oxidative degradation comprising (a) a polymer selected from the group consisting of natural rubber, synthetic polymers of monomers selected from the group consisting of conjugated dienes containing from 4 to 12 carbon atoms per molecule and monoolefins containing form 2 to 8 carbon atoms per molecule, (b) from 0.5 to 250 weight parts of carbon black per 100 parts of polymer, and (c) a stabilizing amount of a 1,1-dimethyl-2-n-piperidylethanethiol.

2. A composition according to claim 1 wherein the amount of said thiol ranges from 0.1 to 5 weight parts per 100 parts of polymer.

3. A composition according to claim 5 wherein said composition is cured.

4. A composition according to claim 2 wherein said composition contains an extender oil in amounts up to about 100 weight percent of the carbon black present.

5. A rubber-carbon black composition of matter comprising a rubber selected from natural rubber and a rubbery polymer of a conjugated diene having from 4 to 12 carbon atoms, from about 1 to about 150 weight parts carbon black per 100 parts of rubber, and as the antioxidant a stabilizing amount of 1,1-dimethyl-2-N-piperidylethanethiol.

6. A composition according to claim 5 wherein said rubbery polymer is a polymer of butadiene.

7. A composition of matter comprising a rubber selected from natural rubber and a polymer of butadiene, from 10 to 150 weight parts carbon black per 100 weight parts rubber, from 10 to 50 weight percent of an aromatic extender oil based on carbon black, and from 0.1 to 5 weight parts of 1,1-dimethyl-2-N-piperidylethanethiol.

8. The composition of claim 7 which also contains from 0.1 to 2 weight parts of 2,2'-methylene-bis-'4-methyl-6-tert-butyl phenol) per 100 parts of rubber.

9. A composition of matter comprising polybutadiene, and per 100 weight parts of polybutadiene, 60 weight parts carbon black, 20 weight parts of a highly aromatic extender oil, and 0.94 weight parts 1,1-dimethyl-2-N-piperidylethanethiol.

10. The composition of claim 9 which contains 0.43 parts 2,2'-methylene-bis-(4-methyl-6-tert-butylphenol).

11. A cured rubber composition of matter comprising a high cis-polybutadiene, and per 100 weight parts of polybutadiene, 10–150 weight parts carbon black, 10–50 weight percent of a highly aromatic extender oil based on carbon black, and a stabilizing amount of 1,1-dimethyl-2-N-piperidylethanethiol and 2,2'-methylene-bis-(4-methyl-6-tert-butylphenol).

12. A composition of matter comprising a rubber selected from natural rubber and a butadiene-styrene polymer, and per 100 weight parts of rubber, 10–150 weight parts carbon black, 10–50 weight percent of a highly aromatic extender oil based on carbon black, and a stabilizing amount of 1,1-dimethyl-2-N-piperidylethanethiol.

13. The composition of claim 12 which additionally contains 2,2'-methylene-bis-(4-methyl-6-tert-butylphenol) as a stabilizer.

References Cited
UNITED STATES PATENTS

| | | | |
|---|---|---|---|
| 2,282,710 | 5/1942 | Dietrich. | |
| 2,356,388 | 8/1944 | Dean | 260—293.4 X |
| 2,964,083 | 12/1960 | Pfau et al. | 260—33.6 |
| 2,967,849 | 1/1961 | Hawkins et al. | 260—45.8 X |
| 3,014,883 | 12/1961 | Wolf | 260—33.6 |
| 3,230,219 | 1/1966 | Csendes | 260—45.9 X |

MORRIS LIEBMAN, *Primary Examiner.*

JULIUS FRAME, *Examiner.*

J. H. DERRINGTON, *Assistant Examiner.*